United States Patent
Fu

(10) Patent No.: US 11,720,182 B2
(45) Date of Patent: Aug. 8, 2023

(54) KEY INDICATION METHOD AND ELECTRONIC DEVICE

(71) Applicant: VIVO MOBILE COMMUNICATION CO., LTD., Guangdong (CN)

(72) Inventor: Conghua Fu, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 17/671,916

(22) Filed: Feb. 15, 2022

(65) Prior Publication Data

US 2022/0171471 A1 Jun. 2, 2022

Related U.S. Application Data

(63) Continuation of application No. PCT/CN2020/105515, filed on Jul. 29, 2020.

(30) Foreign Application Priority Data

Aug. 16, 2019 (CN) .......................... 201910759666.8

(51) Int. Cl.
- G06F 3/041 (2006.01)
- G09G 5/00 (2006.01)
- G06F 3/02 (2006.01)
- G06F 3/0346 (2013.01)

(52) U.S. Cl.
CPC .......... G06F 3/0202 (2013.01); G06F 3/0346 (2013.01)

(58) Field of Classification Search
None
See application file for complete search history.

(56) References Cited

U.S. PATENT DOCUMENTS

| | | | |
|---|---|---|---|
| 2010/0182265 A1* | 7/2010 | Kim | ..................... G06F 1/1641 345/1.3 |
| 2017/0153793 A1 | 6/2017 | Zhu et al. | |
| 2018/0314362 A1 | 11/2018 | Kim et al. | |

FOREIGN PATENT DOCUMENTS

| | | |
|---|---|---|
| CN | 104035648 A | 9/2014 |
| CN | 104216640 A | 12/2014 |
| CN | 106484236 A | 3/2017 |
| CN | 107566579 A | 1/2018 |
| CN | 108427524 A | 8/2018 |
| CN | 108897668 A | 11/2018 |
| CN | 110413172 A | 11/2019 |
| JP | 2005269243 A | 9/2005 |
| JP | 2012145867 A | 8/2012 |
| JP | 2013065289 A | 1/2013 |
| JP | 2013225260 A | 10/2013 |
| JP | 2014134867 A | 7/2014 |
| JP | 2018014120 A | 1/2018 |

* cited by examiner

*Primary Examiner* — Carl Adams
(74) *Attorney, Agent, or Firm* — Price Heneveld LLP

(57) ABSTRACT

A key indication method, applied to an electronic device, is provided. The electronic device has at least one key, and the method includes: obtaining state information of the electronic device; and in a case that the state information meets a preset condition, displaying a target indication icon corresponding to the key in a first manner, in a key display area corresponding to the key on a display screen.

20 Claims, 9 Drawing Sheets

---

Obtain state information of the electronic device — 11

In a case that the state information meets a preset condition, display a target indication icon corresponding to the key in a first manner, in a key display area corresponding to the key on a display screen — 12

KEY INDICATION METHOD AND ELECTRONIC DEVICE

CROSS-REFERENCE TO RELATED APPLICATIONS

This application is a continuation application of PCT International Application No. PCT/CN2020/105515 filed on Jul. 29, 2020, which claims priority to Chinese Patent Application No. 201910759666.8, filed on Aug. 16, 2019 in China, which are incorporated in their entireties by reference herein.

TECHNICAL FIELD

The present invention relates to the field of communications technologies, and in particular, to a key indication method and an electronic device.

BACKGROUND

Currently, a key, such as a physical key or a virtual key, is generally disposed in an electronic device, and a control function of the electronic device is implemented by operating the key. For example, for a key, a hole is made in an outer housing such as a middle frame, and a key cap is disposed at the hole. When a user touches the key cap, movement of the key cap may trigger a micro switch under the key cap to be turned on, thereby implementing a key function. For another key, a sensing element is disposed at an outer housing such as a middle frame, to avoid the hoe in the middle frame. When the user touches the key, a key position of a housing of the middle frame is deformed, and the deformation may be sensed by using the sensing element, to implement the key function. Although this key can avoid impact of the hole in the middle frame on performance of the electronic device such as mechanical strength, waterproof, and dust protection, because there is no recognition feature such as a protrusion on a surface of the housing of the middle frame, it is difficult for the user to recognize a key position in an environment in a poor light environment.

SUMMARY

The present invention provides a key indication method and an electronic device, to resolve a problem that a user cannot recognize a key position in a poor light environment.

To resolve the foregoing technical problem, the present invention is implemented as follows:

According to a first aspect, an embodiment of the present invention provides a key indication method, applied to an electronic device, where the electronic device has at least one key, and the method includes:

obtaining state information of the electronic device; and in a case that the state information meets a preset condition, displaying a target indication icon corresponding to the key in a first manner, in a key display area corresponding to the key on a display screen.

According to a second aspect, an embodiment of the present invention further provides an electronic device, where the electronic device has at least one key, and the electronic device includes:

an obtaining module, configured to obtain state information of the electronic device; and a display module, configured to: in a case that the state information meets a preset condition, display a target indication icon corresponding to the key in a first manner, in a key display area corresponding to the key on a display screen.

According to a third aspect, an embodiment of the present invention further provides an electronic device, including a processor, a memory, and a computer program that is stored in the memory and that can be run on the processor, and when the computer program is executed by the processor, the steps of the foregoing key indication method are implemented.

According to a fourth aspect, an embodiment of the present invention further provides a computer-readable storage medium, where the computer-readable storage medium stores a computer program, and when the computer program is executed by a processor, the steps of the foregoing key indication method are implemented.

In the embodiments of the present invention, the state information of the electronic device is obtained; and in a case that the state information meets the preset condition, the target indication icon corresponding to the key is displayed in the first manner in the key display area corresponding to the key on the display screen, to ensure that a user can directly determine a position of the target indication icon, and further determine a position of the corresponding key, to avoid a problem that the user cannot recognize a key position in a poor light environment, thereby facilitating operations.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may obtain other accompanying drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
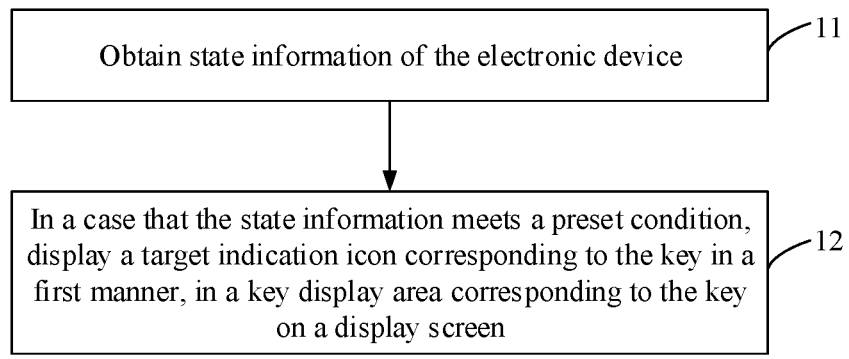
FIG. 1 is a first flowchart of a key indication method according to an embodiment of the present invention.

As shown in FIG. 1, an embodiment of the present invention provides a key indication method, applied to an electronic device, where the electronic device has at least one key.

Figure 2:
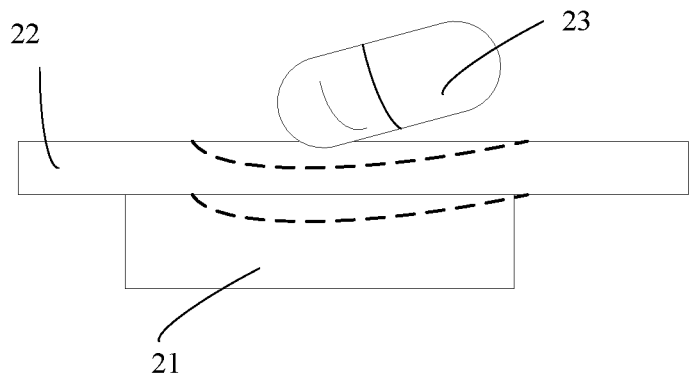
FIG. 2 is a schematic structural diagram of a key according to an embodiment of the present invention.

The key may be a physical key, a sensing key, a touch key, or another type of key. This is not specifically limited in this embodiment of the present invention. The key is used to receive an interactive instruction that is input by a user through an operation such as pressing, touching, or tapping. As shown in FIG. 2, an example of a key is provided. The key has a sensing element 21, such as a pressure sensor. The sensing element 21 is disposed on an inside of a middle frame 22 of the electronic device. In this case, when a finger 23 of the user presses the key, a deformation occurs to the middle frame 22 (as shown by dashed lines in FIG. 2). The sensing element 21 senses a deformation degree of the middle frame 22, that is, a pressure value on the key, so that it can be determined, based on the pressure value, whether the key is triggered.

Step 11: Obtain state information of the electronic device.

Optionally, the state information may include but is not limited to at least one of the following: a motion parameter of the electronic device, screen state information, state information of a central processing unit (CPU), a type of a current running application, and the like.

The motion parameter may include but is not limited to at least one of the following: a moving speed, a moving acceleration, and a flip angle. For example, an electronic device such as a smartphone or a watch configured with a low-power accelerometer may monitor a linear acceleration of the electronic device in a three-dimensional coordinate system when the electronic device is powered on; or an electronic device configured with a speed sensor may monitor a moving speed of the electronic device when the electronic device is powered on; or an electronic device configured with a gravity sensor or a gyroscope may detect a flip state of the electronic device.

The screen state information may include first information of a screen-on state and second information of a screen-off state. The state information of the CPU may include a working state, a running state, and the like of the CPU.

Step 12: In a case that the state information meets a preset condition, a target indication icon corresponding to the key is displayed in a first manner, in a key display area corresponding to the key on a display screen.

Optionally, in a case that the state information is the motion parameter of the electronic device, that the state information meets the preset condition includes at least one of the following: a moving speed of the electronic device is greater than a preset speed, a moving acceleration of the electronic device is greater than a preset acceleration, and a flip angle of the electronic device is greater than a preset angle.

Optionally, in a case that the state information is the screen state information of the electronic device, that the state information meets the preset condition may include: the screen state information is the first information indicating the screen-on state.

Optionally, in a case that the state information is the state information of the CPU, that the state information meets the preset condition may include: the working state of the CPU is a user state, the running state meets a preset condition, and the like.

Optionally, in a case that the state information is the type of the current running application, that the state information meets the predetermined condition may further include:

the type of the current running application is a predetermined application type, and the like.

It should be noted that, in a case that the state information may include but is not limited to at least one of the following: the motion parameter of the electronic device, the screen state information, the state information of the central processing unit (CPU), and the type of the current running application, the preset condition may also be correspondingly determined based on a combination of the foregoing preset conditions corresponding to the state information. For example, in a case that the state information is the state information of the CPU and the type of the current running application, if the working state of the CPU is the user state and the type of the current running application is the predetermined application type, it is determined that the state information meets the preset condition. Certainly, this may be another combination manner, and the present invention is not limited thereto.

The display screen is configured to display elements such as a text and a graph, and may further receive an interactive instruction that is input by the user through an operation such as tapping or swiping.

Optionally, in an implementation, a position of the target indication icon may be close to a position of the corresponding key, and a horizontal length of the target indication icon may be equivalent to a distribution range of the corresponding key, to facilitate operations and save space, thereby avoiding operation inconvenience caused by excessively being less than or greater than a size of the key.

In another implementation, a position of the target indication icon may be a preset position on the display screen. Specifically, a model icon may be displayed at any position on the display screen, for example, a model icon is displayed in a corner (for example, a lower right corner) of the display screen. The model icon may be marked with a position of a target indication icon corresponding to each key. For example, the model icon may also be a thumbnail of a display interface marked with the position of the target indication icon corresponding to each key.

Optionally, the key display area is different from a key operation area of the key. For example, an operation area of a key is located in a middle frame of the electronic device, and a key display area is located on the display screen of the electronic device. The operation area of the key is an area in which the key in the middle frame is located, and the key display area is used to provide an indication function, so that the user determines a position of the key in the middle frame.

Figure 3:
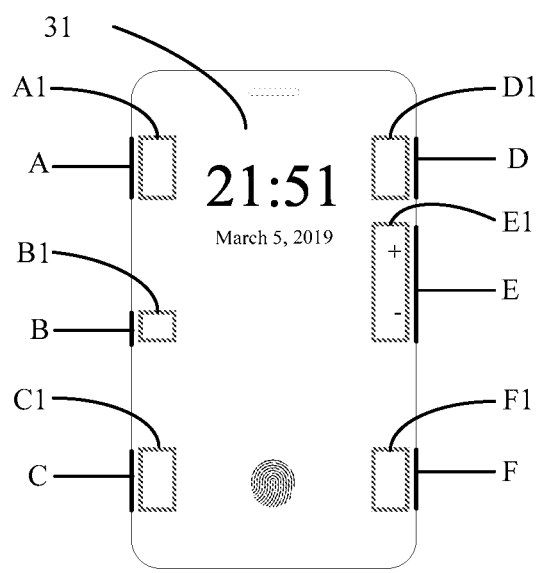
FIG. 3 is a first schematic diagram of display of an indication icon according to an embodiment of the present invention.
Figure 4:
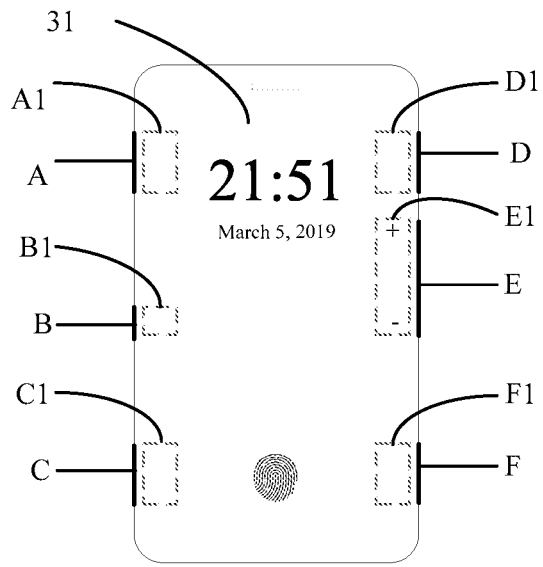
FIG. 4 is a second schematic diagram of display of an indication icon according to an embodiment of the present invention.

FIG. 3 and FIG. 4 show an example of display of an indication icon. One or more keys may be disposed in a middle frame of an electronic device. An electronic device in FIG. 3 has keys A, B, C, D, E, and F that are respectively corresponding to indication icons A1, B1, C1, D1, E1, and F1 on a display screen 31.

In the foregoing solution, the state information of the electronic device is obtained; and in a case that the state information meets the preset condition, the target indication icon corresponding to the key is displayed in the first manner in the key display area corresponding to the key on the display screen, to ensure that a user can directly determine a position of the target indication icon, and further determine a position of the corresponding key, to avoid a problem that the user cannot recognize a key position in a poor light environment, thereby facilitating operations.

Figure 5:
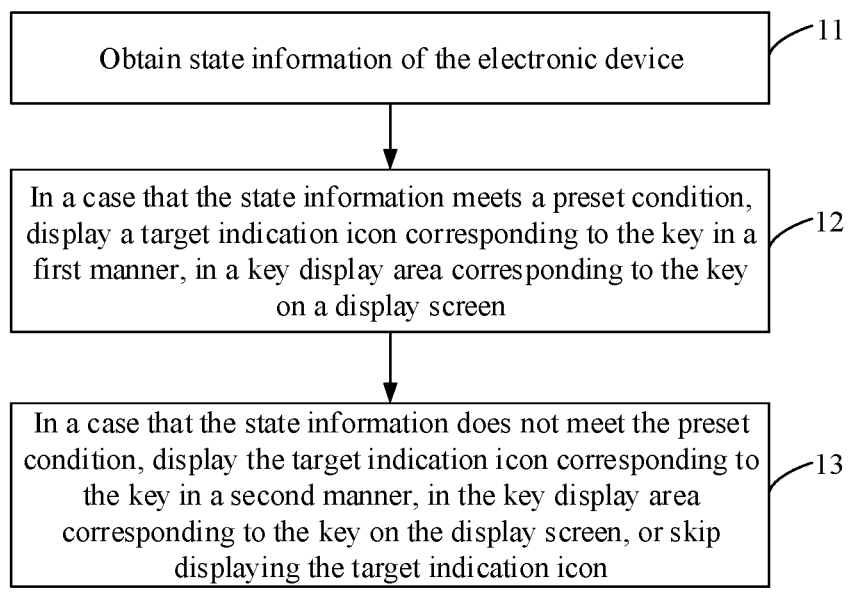
FIG. 5 is a second flowchart of a key indication method according to an embodiment of the present invention.

As shown in FIG. 5, an embodiment of the present invention further provides a key indication method, applied to an electronic device, where the electronic device has at least one key, and the method includes the following steps.

Step 11: Obtain state information of the electronic device.

Optionally, the state information may include but is not limited to at least one of the following: a motion parameter of the electronic device, screen state information, state information of a central processing unit (CPU), a type of a current running application, and the like.

The motion parameter may include but is not limited to at least one of the following: a moving speed, a moving acceleration, and a flip angle. For example, an electronic device such as a smartphone or a watch configured with a low-power accelerometer may monitor a linear acceleration of the electronic device in a three-dimensional coordinate system when the electronic device is powered on; or an electronic device configured with a speed sensor may monitor a moving speed of the electronic device when the electronic device is powered on; or an electronic device configured with a gravity sensor or a gyroscope may detect a flip state of the electronic device.

The screen state information may include first information of a screen-on state and second information of a screen-off state. The state information of the CPU may include a working state, a running state, and the like of the CPU.

Step 12: In a case that the state information meets a preset condition, a target indication icon corresponding to the key is displayed in a first manner, in a key display area corresponding to the key on a display screen.

Optionally, in a case that the state information is the motion parameter of the electronic device, that the state information meets the preset condition includes at least one of the following: a moving speed of the electronic device is greater than a preset speed, a moving acceleration of the electronic device is greater than a preset acceleration, and a flip angle of the electronic device is greater than a preset angle.

Optionally, in a case that the state information is the screen state information of the electronic device, that the state information meets the preset condition may include: the screen state information is the first information indicating the screen-on state.

Optionally, in a case that the state information is the state information of the CPU, that the state information meets the preset condition may include: the working state of the CPU is a user state, the running state meets a preset condition, and the like.

Optionally, in a case that the state information is the type of the current running application, that the state information meets the predetermined condition may further include: the type of the current running application is a predetermined application type, and the like.

It should be noted that, in a case that the state information may include but is not limited to at least one of the following: the motion parameter of the electronic device, the screen state information, the state information of the central processing unit (CPU), and the type of the current running application, the preset condition may also be correspondingly determined based on a combination of the foregoing preset conditions corresponding to the state information. For example, in a case that the state information is the state information of the CPU and the type of the current running application, if the working state of the CPU is the user state and the type of the current running application is the predetermined application type, it is determined that the state information meets the preset condition. Certainly, this may be another combination manner, and the present invention is not limited thereto.

The display screen is configured to display elements such as a text and a graph, and may further receive an interactive instruction that is input by the user through an operation such as tapping or swiping.

Optionally, in an implementation, a position of the target indication icon may be close to a position of the corresponding key, and a horizontal length of the target indication icon may be equivalent to a distribution range of the corresponding key, to facilitate operations and save space, thereby avoiding operation inconvenience caused by excessively being less than or greater than a size of the key.

In another implementation, a position of the target indication icon may be a preset position on the display screen. Specifically, a model icon may be displayed at any position on the display screen, for example, a model icon is displayed in a corner (for example, a lower right corner) of the display screen. The model icon may be marked with a position of a target indication icon corresponding to each key. For example, the model icon may also be a thumbnail of a display interface marked with the position of the target indication icon corresponding to each key.

Optionally, the key display area is different from a key operation area of the key. For example, an operation area of a key is located in a middle frame of the electronic device, and a key display area is located on the display screen of the electronic device. The operation area of the key is an area in which the key in the middle frame is located, and the key display area is used to provide an indication function, so that the user determines a position of the key in the middle frame.

For example, the first manner is an explicit manner. Specifically, in a case that the state information meets the preset condition, the target indication icon corresponding to the key is displayed in the explicit manner. The explicit manner is a display manner in which the target indication icon may be highlighted and displayed in a pattern/an interface other than the key display area on the display screen. For example, the target indication icon is clearly different from display content other than the key display area on the display screen in terms of display parameters such as color and transparency, so that the user can easily discover and distinguish the target indication icon on the display screen, and the user can directly determine a position of the target indication icon, and further determine a position of the key. As shown in FIG. 3, the target indication icon displayed in the explicit manner is identified by using a solid line.

Step 13: In a case that the state information does not meet the preset condition, displaying the target indication icon corresponding to the key in a second manner, in the key display area corresponding to the key on the display screen, or skipping displaying the target indication icon.

Optionally, in a case that the state information is the motion parameter of the electronic device, that the state information does not meet the preset condition includes at least one of the following: the moving speed of the electronic device is less than or equal to the preset speed, the moving acceleration of the electronic device is less than or equal to the preset acceleration, and the flip angle of the electronic device is less than or equal to the preset angle.

Optionally, in a case that the state information is the screen state information of the electronic device, that the state information does not meets the preset condition may include: the screen state information is the second information indicating the screen-off state.

Optionally, in a case that the state information is the state information of the CPU, that the state information does not meet the preset condition may include: the working state of the CPU is a system state and/or the running state does not meet the preset condition, and the like.

Optionally, in a case that the state information is the type of the current running application, that the state information does not meet the predetermined condition may further include: the type of the current running application is not the predetermined application type, and the like.

It should be noted that, in a case that the state information may include but is not limited to at least one of the following: the motion parameter of the electronic device, the screen state information, the state information of the central processing unit (CPU), and the type of the current running application, the preset condition may also be correspondingly determined based on a combination of the foregoing preset conditions corresponding to the state information. For example, in a case that the state information is the screen state information and the type of the current running application, if the screen state information is the first information indicating the screen-on state and the type of the current running application is not the predetermined application type, it is determined that the state information does not meet the preset condition. Certainly, this may be another combination manner, and the present invention is not limited thereto.

For example, the second manner is an implicit manner. Specifically, in a case that the state information does not meet the preset condition, the target indication icon corresponding to the key is displayed in the implicit manner. The implicit manner is a display manner in which the target indication icon may weaken a pattern/an interface displayed on the display screen other than the key display area. For example, the target indication icon is close to display content other than the key display area on the display screen in terms of display parameters such as color and transparency, so that it is relatively difficult for the user to discover and distinguish the indication icon on the display screen, thereby avoiding affecting a display effect of the display screen because the target indication icon occupies a display area on the display screen. For example, display transparency corresponding to the target indication icon in the implicit manner is higher than display transparency corresponding to the target indication icon in the explicit manner. Preferably, if the target indication icon in the implicit manner may be set to a fully transparent state, the target indication icon is not displayed. As shown in FIG. 4, the indication icon displayed in the implicit manner is identified by a dashed line.

Specifically, when the state information is switched from meeting the preset condition to not meeting the preset condition, display of the target indication icon corresponding to the key in the explicit manner is switched to display in the implicit manner. When the state information is switched from not meeting the preset condition to meeting the preset condition, display of the target indication icon corresponding to the key in the implicit manner is switched to display in the explicit manner.

Optionally, FIG. 3 and FIG. 4 show an example of display of an indication icon. One or more keys may be disposed in a middle frame of an electronic device. An electronic device in FIG. 3 has keys A, B, C, D, E, and F that are respectively corresponding to indication icons A1, B1, C1, D1, E1, and F1 on a display screen 31. A display parameter of an indication icon may be not fixed, that is, a display parameter (a pattern, a shape, a color, or the like) of an indication icon may be changed based on a key function of a corresponding key. For example, in an audio play interface, a function of a key E may be a volume adjustment function (volume up "+" and volume down "−"); and in a reading interface (for example, a reading interface of an e-book or a browsing interface of a browser), the function of the key E may be a page flip function (page up and page down).

Taking a game interface as an example, key operation instructions corresponding to the foregoing keys A, C, D, and F are, for example, a left key, a right key, an acceleration key, and a brake key. The key B may be used to receive one of the following operations of the user: a power-on/off operation, a screen-on operation, and a screen-off operation. The key E may be used to receive a volume adjustment operation of the user.

In the foregoing solution, the state information of the electronic device is obtained;

and in a case that the state information meets the preset condition, the target indication icon corresponding to the key is displayed in the first manner in the key display area corresponding to the key on the display screen, to ensure that a user can directly determine a position of the target indication icon, and further determine a position of the corresponding key, to avoid a problem that the user cannot recognize a key position in a poor light environment, thereby facilitating operations. In a case that the state information does not meet the preset condition, the target indication icon corresponding to the key is displayed in the second manner in the key display area corresponding to the key on the display screen or the target indication icon is not displayed, to avoid that the target indication icon occupies a display area of the display screen, thereby affecting a display effect of the display screen.

Optionally, in any one of the foregoing embodiments, the key may further have an active state of responding to a key operation function and an inactive state of not responding to the key operation function; and in a case that the state information meets the preset condition, the key is in the active state; or in a case that the state information does not meet the preset condition, the key is in the inactive state.

Specifically, the key is a sensing key with a sensing element. When the key is in an active mode, it may be determined, in the manner in the foregoing embodiment, whether the key is triggered.

When the key is triggered, the electronic device executes a corresponding key function in response to the trigger, that is, the key can normally detect an operation of the user such as pressing or tapping, and can actively report the event to a control system of the electronic device, and the electronic device will respond to the event.

When the key is not triggered, or when the key is in an inactive mode, the electronic device does not respond regardless of whether a pressing operation is performed on the key, that is, the key cannot detect an operation of the user such as pressing or tapping, and does not actively report the event to the control system of the electronic device, and the electronic device does not respond to the event.

For example, when the key is configured as a volume adjustment function, if the key is in an active mode, the electronic device executes a volume adjustment program when the user presses the key. When the key is in an inactive mode, the electronic device does not execute the volume adjustment program when the user presses the key.

Optionally, the foregoing step 11 may specifically include:

obtaining a motion parameter of the electronic device, where the motion parameter includes at least one of the following: a speed, an acceleration, and a flip state; and determining a function state of the key based on the motion parameter, where the function state of the key has an active state of responding to a key operation function and an inactive state of not responding to the key operation function.

Specifically, if the motion parameter meets a first condition, it is determined that the key is in the active state, where the first condition includes at least one of the following: the speed is greater than a preset speed, the acceleration is greater than a preset acceleration, and the flip state is a first flip state in which a flip angle is greater than a preset angle; and if the motion parameter meets a second condition, it is determined that the key is in the inactive state, where the second condition includes at least one of the following: the speed is less than or equal to the preset speed, the acceleration is less than or equal to the preset acceleration, and the flip state is a second flip state in which the flip angle is less than or equal to the preset angle.

In an implementation, an electronic device such as a smartphone or a watch configured with a low-power accelerometer may monitor a linear acceleration of the electronic device in a three-dimensional coordinate system when the electronic device is powered on, and may determine a current motion state of the electronic device based on the monitored linear acceleration. For example, when the electronic device is still on a desktop, and the monitored linear acceleration is in a first acceleration range (or a variation of the monitored linear acceleration approaches zero), it is determined that the moving state of the electronic device is a still state, that is, the inactive state, and a display manner of an indication icon corresponding to the key is configured as an implicit manner, for example, displaying in light color and increasing transparency.

When the electronic device is in hands of the user and the user is in a moving state such as walking, swimming, or running, the monitored linear acceleration is in a second acceleration range (or a variation of the monitored linear acceleration is relatively large or has a certain regular change), it is determined that the moving state of the electronic device is a strenuous moving/shaking state, that is, the active state, and the display manner of the indication icon corresponding to the key is configured as an explicit manner, for example: displaying in dark and reducing transparency.

Optionally, the electronic device may be further determined to be in the active state when it is detected that the moving state of the electronic device is a still state, and the electronic device is determined to be in the inactive state when it is detected that the moving state of the electronic device is a strenuous moving/shaking state.

In another implementation, an electronic device configured with a speed sensor may monitor a moving speed of the electronic device when the electronic device is powered on, and may determine a current moving state of the electronic device based on the monitored moving speed. For example, when the electronic device is still on a desktop, and the monitored moving speed is in a first speed range (or a variation of the monitored moving speed approaches zero), it is determined that the moving state of the electronic device is a still state, that is, the inactive state, and a display manner of an indication icon corresponding to the key is configured as an implicit manner, for example, displaying in light color and increasing transparency.

When the electronic device is in hands of the user and the user is in a moving state such as walking, swimming, or running, the monitored moving speed is in a second speed range (or a variation of the monitored moving speed is relatively large or has a certain regular change), it is determined that the moving state of the electronic device is a strenuous moving/shaking state, that is, the active state, and the display manner of the indication icon corresponding to the key is configured as an explicit manner, for example: displaying in dark and reducing transparency.

Optionally, the electronic device may be further determined to be in the active state when it is detected that the moving state of the electronic device is a still state, and the electronic device is determined to be in the inactive state when it is detected that the moving state of the electronic device is a strenuous moving/shaking state.

In still another implementation, an electronic device configured with a gravity sensor, a gyroscope, or the like may detect a flip state of the electronic device. For example, if the display screen is used as a reference, the electronic device switches from a horizontal state of the display screen to a state in which an included angle of the display screen on a horizontal plane reaches a preset angle (the electronic device that is still on the desktop is held by the user, and the display screen is tilted by a predetermined angle), or the display screen of the electronic device is flipped down to up horizontally, or the display screen of the electronic device is flipped up to down horizontally, it is determined that the flip state of the electronic device is a first flip state, that is, the flip state is the active state, and a display manner of an indication icon corresponding to the key is configured as an explicit manner, for example, displaying in dark and reducing transparency.

When the flip angle of the electronic device is less than a preset angle, it is determined that the flip state of the electronic device is a second flip state, that is, the inactive state, and the display manner of the indication icon corresponding to the key is configured as an implicit manner, for example, displaying in light color and increasing transparency.

In this way, when the electronic device is in a lock screen state, the function state of the key may be determined by monitoring the moving state of the electronic device, for example, the electronic device actively activates the key in a still state and indicates a position of the key by using an indication icon, and actively disables the key in a moving state and cancels the indication of the position of the key by using the indication icon. In this way, a user experience requirement can be met, power of the electronic device can be saved, and a relatively tidy display interface can be maintained when the electronic device is still.

Figure 6:
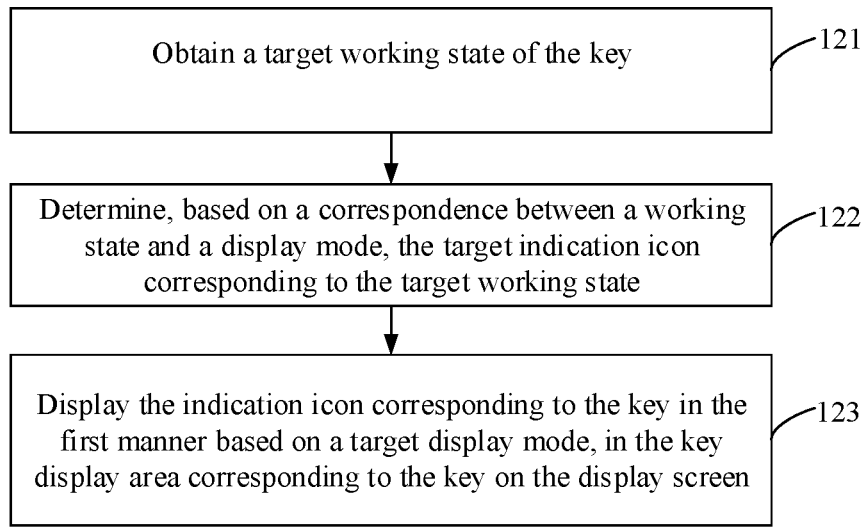
FIG. 6 is a flowchart of displaying an indication icon corresponding to a key in a first manner according to an embodiment of the present invention.

As shown in FIG. 6, according to at least one of the foregoing embodiments, in a case that the key is in the active state, the step of displaying, in a key display area corresponding to the key on a display screen in a first explicit manner, a target indication icon corresponding to the key may specifically include the following steps.

Step 121: Obtain a target working state of the key.

Specifically, a sensing parameter of the key may be obtained, for example, the sensing parameter of the key may be obtained by using a sensing element in the key. If a variation of the sensing parameter reaches a preset threshold, it is determined that a working state of the key is a trigger state; and if the variation of the sensing parameter is less than the preset threshold, it is determined that the working state of the key is a non-trigger state.

When the key is in an active mode, the key is triggered if a finger of the user presses and taps an area in which the key is located. The trigger means that if the key detects a change in the sensing parameter such as a pressure, a temperature, and a deformation amount, or a relatively significant change (a variation of the pressure, the temperature, or the deformation amount reaches a preset threshold), it is determined that a key operation behavior of the user is detected. Optionally, the trigger state of the key may include at least a pre-trigger state, an in-trigger state, and a post-trigger state in an order of occurrence. Both the pre-trigger state and the post-trigger state are a non-trigger state, and the in-trigger state is a trigger state.

Step 122: Determine, based on a correspondence between a working state and a display mode, the target indication icon corresponding to the target working state.

Figure 7:
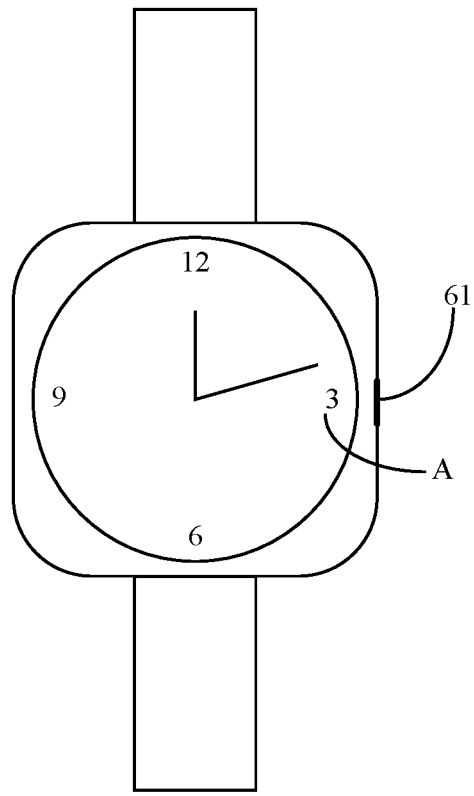
FIG. 7 is a first schematic diagram of a corresponding indication icon when a key is in a non-trigger state according to an embodiment of the present invention.
Figure 8:
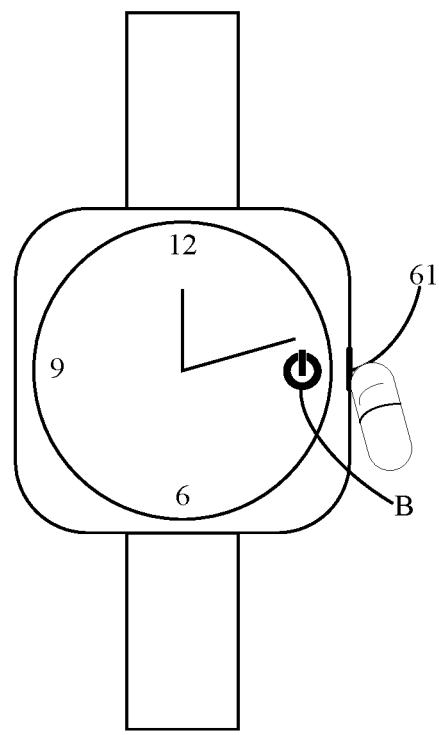
FIG. 8 is a first schematic diagram of a corresponding indication icon when a key is in a trigger state according to an embodiment of the present invention.

In target indication icons corresponding to different target working states, at least one of the following may be different: a shape of an indication icon, a pattern of an indication icon, a color of an indication icon, and the like. FIG. 7 and FIG. 8 are schematic diagrams of a display interface of an electronic device, where the electronic device is a smart watch. A first display mode may mean that an indication icon A is displayed, and a second display mode may mean that an indication icon B is displayed. The indication icon A may be a number or a scale on a dial of the watch, and is used to indicate a display time of the watch and a position of a key 61. The indication icon B may show a key function on the dial of the watch, and is used to indicate a trigger state and a corresponding function of the key 61.

Step 123: The indication icon corresponding to the key is displayed in the first manner based on a target display mode, in the key display area corresponding to the key on the display screen.

Specifically, in a case that the working state of the key is the trigger state, the target indication icon corresponding to the key is displayed in the first manner in the key display area corresponding to the key on the display screen, where the target indication icon is an icon having a first pattern; and in a case that the working state of the key is the non-trigger state, the target indication icon corresponding to the key is displayed in the first manner in the key display area corresponding to the key on the display screen, where the target indication icon is an icon having a second pattern.

Optionally, when the key is in the trigger state, the target indication icon is displayed in the first display mode, for example, a pattern of the target indication icon is the first pattern. When the key is in a non-trigger state, the target indication icon is displayed in the second display mode, for example, the pattern of the target indication icon is the second pattern. Indication icons corresponding to pre-trigger and post-trigger phases of the key may be different from an indication icon corresponding to an in-trigger phase.

As shown in FIG. 7, when a key 61 of a smart watch is in a non-trigger state, an indication icon A corresponding to the key 61 is used to display a clock scale, such as a number "3", to indicate a display time of the watch and a position of the key 61. As shown in FIG. 8, when the key 61 of the smart watch is in a trigger state, an indication icon B corresponding to the key may be a key function icon on a dial of the watch, such as a "power pattern", to indicate that a function of the key is an on/off function.

Figure 9:
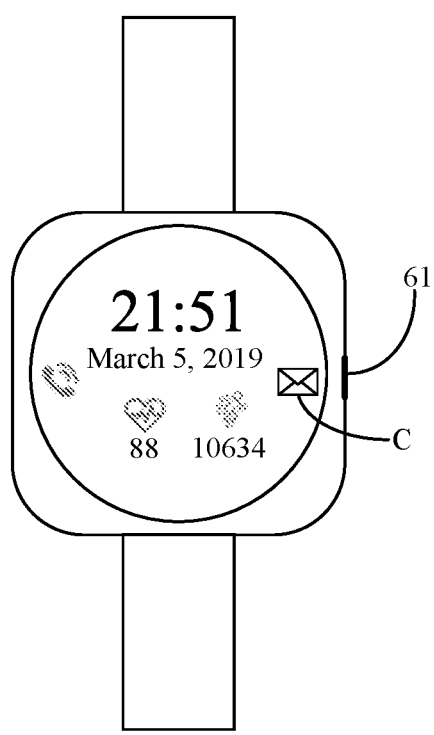
FIG. 9 is a second schematic diagram of a corresponding indication icon when a key is in a non-trigger state according to an embodiment of the present invention.
Figure 10:
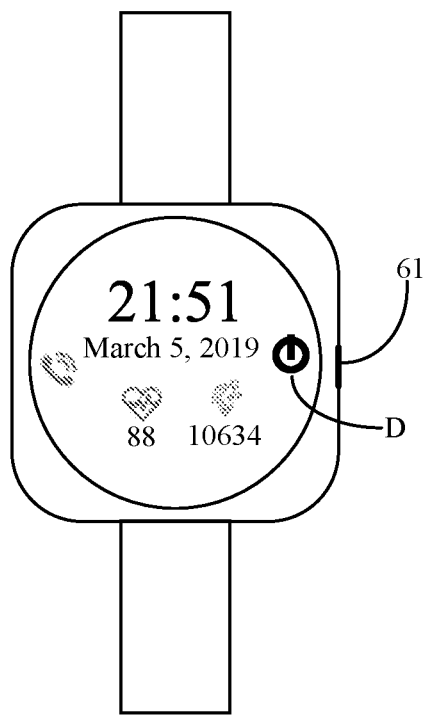
FIG. 10 is a second schematic diagram of a corresponding indication icon when a key is in a trigger state according to an embodiment of the present invention.

As shown in FIG. 9, an indication icon C corresponding to the key 61 may be an icon used to indicate a quantity of unread messages and a state. As shown in FIG. 10, an indication icon D corresponding to the key 61 may be a power key icon on the dial of the watch. When the user does not touch/press the key 61 (the key 61 is in the non-trigger state), an indication icon C is displayed in a key display area corresponding to the key 61. When the user touches/presses the key 61 (that is, the key 61 is in the trigger state), the indication icon C displayed in the key display area corresponding to the key 61 is replaced with an indication icon D. When the user releases the key 61 (that is, the key 61 is in the non-trigger state), the indication icon D displayed in the key display area corresponding to the key 61 is replaced with the indication icon C again. Preferably, icon sizes and display positions of the indication icon C and the indication icon D are basically equivalent.

In this embodiment, for the working state of the key, that is, when the key is in the trigger state and the non-trigger state, different indication icons are displayed in the key display area corresponding to the key, to prompt the working state of the key. In addition, a function icon corresponding to a current state of the key is displayed by using an indication icon, to indicate a key function currently corresponding to the key.

According to at least one of the foregoing embodiments, in a case that the physical key is in the active state, the step of displaying a target indication icon corresponding to the key in a first manner, in a key display area corresponding to the key on a display screen may specifically include:

obtaining target application information, where for example, the target application information may be application information of a foreground application;

configuring a key function corresponding to the key based on the target application information; and displaying the target indication icon corresponding to the key function in the first manner, in the key display area corresponding to the key on the display screen.

For example, in a case that the target application information is an audio play interface, a function of a key E may be a volume adjustment function (volume up "+" and volume down "−"); and in a case that the target application information is a reading interface (for example, a reading interface of an e-book or a browsing interface of a browser), the function of the key E may be a page flip function (page up and page down). In this way, for different applications of the electronic device that are currently running in the foreground, different indication icons are displayed in the key display area corresponding to the key, to indicate a key function of the key in different applications.

According to at least one of the foregoing embodiments, the display screen is a foldable screen; and in a case that the key is in the active state, the step of displaying a target indication icon corresponding to the key in a first manner, in a key display area corresponding to the key on a display screen may specifically include:

obtaining a state of the foldable screen;

when the foldable screen is in a folding state, configuring a function of the key as a first key function, and displaying, in the key display area corresponding to the key on the display screen, a first target indication icon corresponding to the first key function; and when the foldable screen is in an unfolding state, configuring the function of the key as a second key function, and displaying, in the key display area corresponding to the key on the display screen, a second target indication icon corresponding to the second key function.

With reference to a specific example, the following describes a key indication method of the electronic device with the foldable screen.

Example 1

Figure 11:
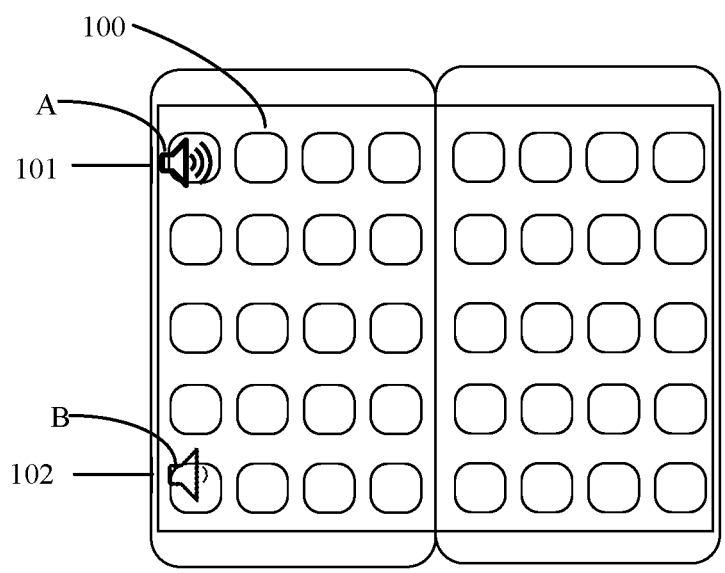
FIG. 11 is a first schematic diagram of display of an indication icon corresponding to a key when an electronic device is in an unfolding state according to an embodiment of the present invention.
Figure 12:
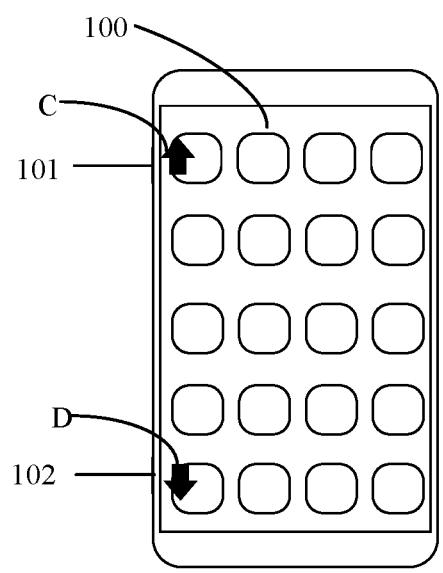
FIG. 12 is a first schematic diagram of display of an indication icon corresponding to a key when an electronic device is in a folding state according to an embodiment of the present invention.

FIG. 11 to FIG. 16 show an example of an electronic device with a foldable screen. As shown in FIG. 11, when a display screen 100 of the electronic device is in an unfolding state, functions corresponding to keys 101 and 102 may be volume + and volume −, an indication icon A of "volume −" is displayed in a key display area corresponding to the key 101, and an indication icon B of "volume −" is displayed in a key display area corresponding to the key 101. As shown in FIG. 12, when the display screen of the electronic device is in a folding state, the functions corresponding to the keys 101 and 102 may be a left game operation function and a right game operation function, an indication icon C indicating "left" is displayed in the key display area corresponding to the key 101, and an indication icon D indicating "right" is displayed in the key display area corresponding to the key 101.

Example 2

Figure 13:
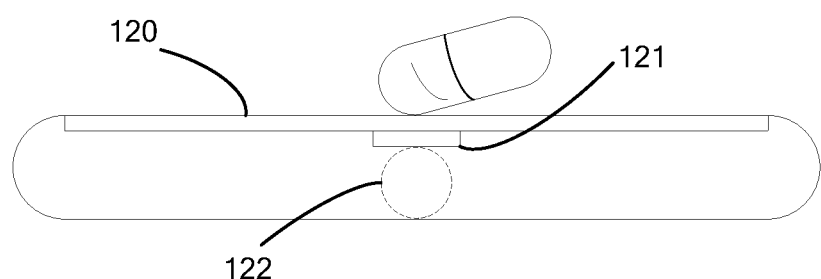
FIG. 13 is a schematic structural diagram of a key of an electronic device with a foldable screen according to an embodiment of the present invention.

As shown in FIG. 13, a key 121 implemented based on a principle such as a pressure sensor is disposed below a foldable display 120. Optionally, the key 121 is disposed between a spindle or hinge structure 122 that implements folding of the display screen 120 and the display screen 120. When a finger presses a display area corresponding to the key 121, the display screen deforms to transmit a pressure to the key 121, that is, the key 121 receives an input operation of the user.

Figure 14:
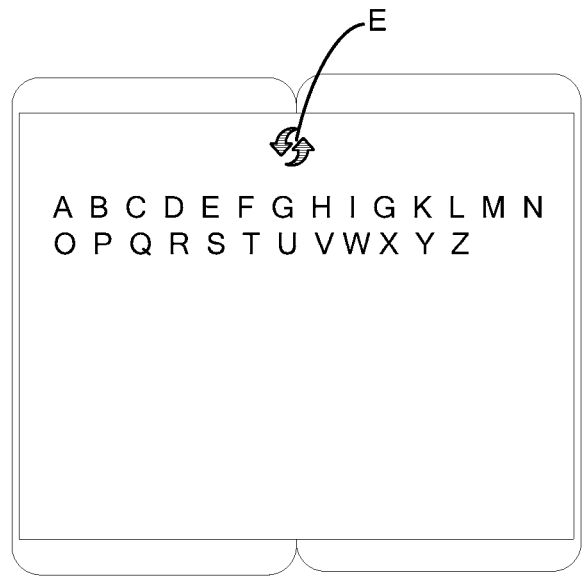
FIG. 14 is a second schematic diagram of display of an indication icon corresponding to a key when an electronic device is in an unfolding state according to an embodiment of the present invention.
Figure 15:
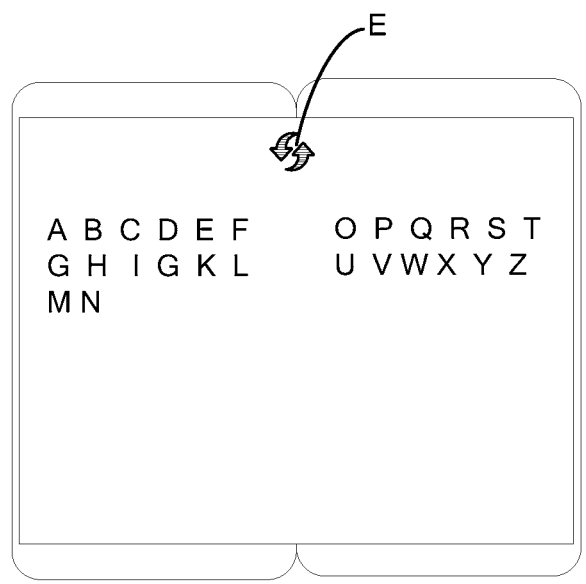
FIG. 15 is a third schematic diagram of display of an indication icon corresponding to a key when an electronic device is in an unfolding state according to an embodiment of the present invention.

For example, when the display screen of the electronic device is in an unfolding state, a function of the key 121 may be configured as a function of switching single-page/dual-page display. As shown in FIG. 14 and FIG. 15, an indication icon E is displayed in a front projection area (a key display area) of the key 121 on the display screen as an indication icon of the function of switching single-page/dual-page display. FIG. 14 shows an example of single-page display, that is, the entire display screen is used as a complete display page. FIG. 15 shows an example of two-page display, that is, the entire display screen is divided into a left page and a right page for display, and content between the left page and the right page is independent, and has an obvious paging feature.

Figure 16:
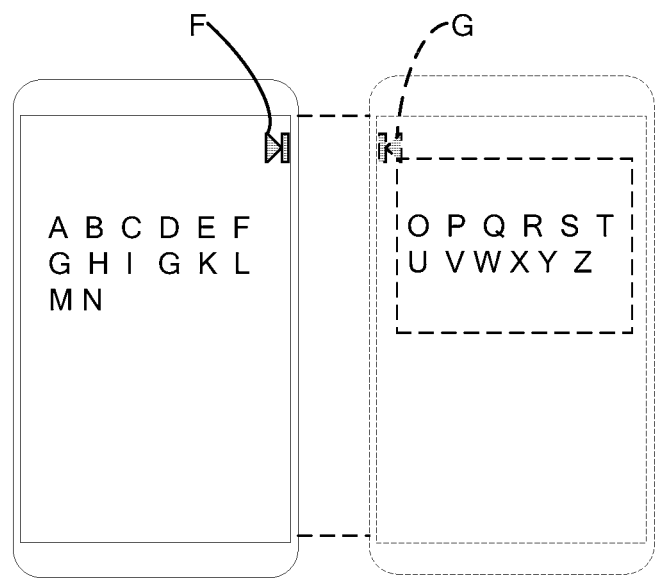
FIG. 16 is a second schematic diagram of display of an indication icon corresponding to a key when an electronic device is in a folding state according to an embodiment of the present invention.

When the display screen of the electronic device is in a folding state, the function of the key 121 may be configured as a function of switching to a next page. As shown in FIG. 16, an indication icon F (or an indication icon G) is displayed in a front projection area (a key display area) of the key 121 on the display screen as an indication icon of the function of switching to a next page. When the display screen is in a folding state, the key 121 is actually on a side of the electronic device, which is equivalent to one side key. When the user presses an area in which the key 121 is located, the electronic device performs a down page operation. When the display screen operated by the user is a left display screen in FIG. 16, the indication icon F is displayed in the key display area corresponding to the key 121. When the display screen operated by the user is a right side display screen in FIG. 16, the indication icon G is displayed in the key display area corresponding to the key 121.

In this embodiment, for a physical state of the electronic device, that is, when the display screen of the electronic device is in a folding state and an unfolding state, different indication icons are displayed in the key display area corresponding to the key, to prompt a current key function of the key, thereby improving product usability.

Figure 17:
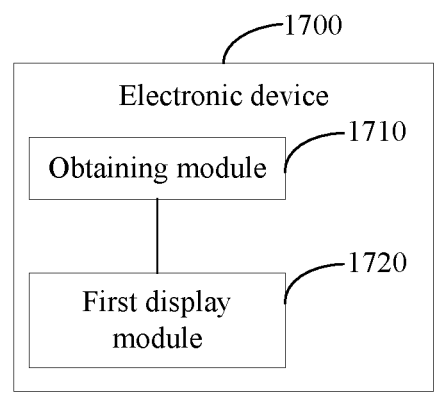
FIG. 17 is a block diagram of an electronic device according to an embodiment of the present invention.

As shown in FIG. 17, an embodiment of the present invention provides an electronic device 1700, where the electronic device has at least one key, and the electronic device 1700 includes:

an obtaining module 1710, configured to obtain state information of the electronic device; and a display module 1720, configured to: in a case that the state information meets a preset condition, display a target indication icon corresponding to the key in a first manner, in a key display area corresponding to the key on a display screen.

Optionally, the electronic device 1700 further includes:

a second display module 1730, configured to: in a case that the state information does not meet the preset condition, display the target indication icon corresponding to the key in a second manner, in the key display area corresponding to the key on the display screen, or skip displaying the target indication icon.

Optionally, the key display area is different from a key operation area of the key.

Optionally, the key has an active state of responding to a key operation function and an inactive state of not responding to the key operation function; and in a case that the state information meets the preset condition, the key is in the active state; or in a case that the state information does not meet the preset condition, the key is in the inactive state.

Optionally, the state information is a motion parameter of the electronic device, and the motion parameter includes at least one of the following: a moving speed, a moving acceleration, and a flip angle.

Optionally, the preset condition includes at least one of the following: a moving speed of the electronic device is greater than a preset speed, a moving acceleration of the electronic device is greater than a preset acceleration, and a flip angle of the electronic device is greater than a preset angle.

Optionally, in a case that the key is in the active state, the first display module 1720 specifically includes:

a first obtaining submodule, configured to obtain a target working state of the key;

a determining submodule, configured to determine, based on a correspondence between a working state of the key and an indication icon of the key, the target indication icon corresponding to the target working state; and a first display submodule, configured to display the target indication icon corresponding to the key in the first manner, in the key display area corresponding to the key on the display screen.

Optionally, the key is a sensing key, and the first obtaining submodule specifically includes:

an obtaining unit, configured to obtain a sensing parameter of the sensing key;

a first determining unit, configured to: if a variation of the sensing parameter reaches a preset threshold, determine that the target working state of the key is a trigger state; and a second determining unit, configured to: if the variation of the sensing parameter is less than the preset threshold, determine that the target working state of the key is a non-trigger state; and the first display submodule specifically includes:

a first display unit, configured to: in a case that the target working state of the key is the trigger state, display the target indication icon corresponding to the key in the first manner, in the key display area corresponding to the key on the display screen, where the target indication icon is an icon having a first pattern; and a second display unit, configured to: in a case that the target working state of the key is the non-trigger state, display the target indication icon corresponding to the key in the first manner, in the key display area corresponding to the key on the display screen, where the target indication icon is an icon having a second pattern.

Optionally, in a case that the key is in the active state, the first display module 1720 includes:

a second obtaining submodule, configured to obtain target application information;

a configuration submodule, configured to configure a key function corresponding to the key based on the target application information; and a second display submodule, configured to display the target indication icon corresponding to the key function in the first manner, in the key display area corresponding to the key on the display screen.

Optionally, the display screen is a foldable screen, and the first display module 1720 includes:

a third obtaining submodule, configured to obtain a state of the foldable screen in a case that the key is in the active state;

a third display submodule, configured to: when the foldable screen is in a folding state, configure a function of the key as a first key function, and display, in the key display area corresponding to the key on the display screen, a first target indication icon corresponding to the first key function; and a fourth display submodule, configured to: when the foldable screen is in an unfolding state, configure the function of the key as a second key function, and display, in the key display area corresponding to the key on the display screen, a second target indication icon corresponding to the second key function.

The electronic device provided in this embodiment of the present invention can implement the processes implemented by the electronic device in the method embodiment in FIG. 1 to FIG. 16. To avoid repetition, details are not described herein again.

According to the electronic device 1700 in this embodiment of the present invention, the state information of the electronic device is obtained; and in a case that the state information meets the preset condition, the target indication icon corresponding to the key is displayed in the first manner in the key display area corresponding to the key on the display screen, to ensure that a user can directly determine a position of the target indication icon, and further determine a position of the corresponding key, to avoid a problem that the user cannot recognize a key position in a poor light environment, thereby facilitating operations.

Figure 18:
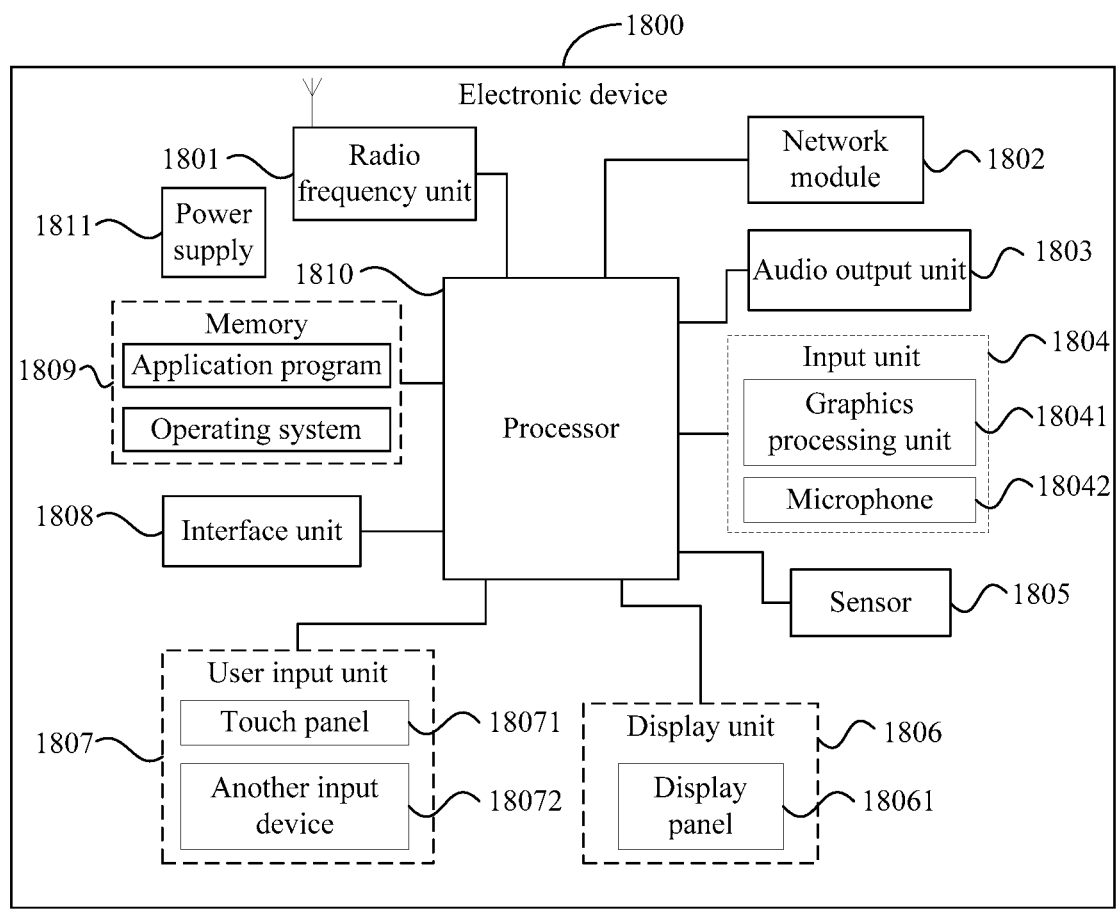
FIG. 18 is a schematic structural diagram of hardware of an electronic device according to an embodiment of the present invention.

FIG. 18 is a schematic structural diagram of hardware of an electronic device according to the embodiments of the present invention.

An electronic device 1800 includes but is not limited to components such as a radio frequency unit 1801, a network module 1802, an audio output unit 1803, an input unit 1804, a sensor 1805, a display unit 1806, a user input unit 1807, an interface unit 1808, a memory 1809, a processor 1810, and a power supply 1811. A person skilled in the art may understand that a structure of the electronic device shown in FIG. 18 constitutes no limitation on the electronic device, and the electronic device may include more or fewer components than those shown in the figure, or have a combination of some components, or have a different component arrangement. In this embodiment of the present invention, the electronic device includes but is not limited to a mobile phone, a tablet computer, a notebook computer, a palmtop computer, an in-vehicle terminal, a wearable device, a pedometer, and the like.

The electronic device has at least one key, and the processor 1810 is configured to: obtain state information of the electronic device; and in a case that the state information meets a preset condition, display a target indication icon corresponding to the key in a first manner, in a key display area corresponding to the key on a display screen.

According to the electronic device 1800 in this embodiment of the present invention, the state information of the electronic device is obtained; and in a case that the state information meets the preset condition, the target indication icon corresponding to the key is displayed in the first manner in the key display area corresponding to the key on the display screen, to ensure that a user can directly determine a position of the target indication icon, and further determine a position of the corresponding key, to avoid a problem that the user cannot recognize a key position in a poor light environment, thereby facilitating operations.

It should be understood that, in this embodiment of the present invention, the radio frequency unit 1801 may be configured to receive and send information or a signal in a call process. Specifically, after receiving downlink data from a base station, the radio frequency unit 1801 sends the downlink data to the processor 1810 for processing. In addition, the radio frequency unit 1801 sends uplink data to the base station. Usually, the radio frequency unit 1801 includes but is not limited to an antenna, at least one amplifier, a transceiver, a coupler, a low noise amplifier, a duplexer, and the like. In addition, the radio frequency unit 1801 may communicate with a network and another device through a wireless communication system.

The electronic device provides wireless broadband Internet access for the user by using the network module 1802, for example, helping the user to send and receive an e-mail, brows a web page, and access streaming media.

The audio output unit 1803 may convert audio data received by the radio frequency unit 1801 or the network module 1802 or stored in the memory 1809 into an audio signal and output the audio signal as a sound. In addition, the audio output unit 1803 may further provide an audio output (for example, a call signal received voice, or a message received voice) related to a specific function implemented by the electronic device 1800. The audio output unit 1803 includes a speaker, a buzzer, a telephone receiver, and the like.

The input unit 1804 is configured to receive an audio signal or a video signal. The input unit 1804 may include a graphics processing unit (GPU) 18041 and a microphone 18042, and the graphics processing unit 18041 processes image data of a still picture or video obtained by an image capture apparatus (such as a camera) in a video capture mode or an image capture mode. A processed image frame may be displayed on the display unit 1806. The image frame processed by the graphics processing unit 18041 may be stored in the memory 1809 (or another storage medium) or sent by using the radio frequency unit 1801 or the network module 1802. The microphone 18042 may receive a sound and can process such sound into audio data. Processed audio data may be converted, in a call mode, into a format that can be sent to a mobile communication base station by using the radio frequency unit 1801 for output.

The electronic device 1800 further includes at least one sensor 1805 such as a light sensor, a motion sensor, and another sensor. Specifically, the light sensor includes an ambient light sensor and a proximity sensor. The ambient light sensor may adjust luminance of the display panel 18061 based on brightness of ambient light. The proximity sensor may turn off the display panel 18061 and/or backlight when the electronic device 1800 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the electronic device (such as screen switching between landscape and portrait modes, a related game, or magnetometer posture calibration), a function related to vibration recognition (such as a pedometer or a knock), and the like. The sensor 1805 may further include a fingerprint sensor, a pressure sensor, an iris sensor, a molecular sensor, a gyroscope, a barometer, a hygrometer, a thermometer, an infrared sensor, and the like. Details are not described herein.

The display unit 1806 is configured to display information entered by a user or information provided for a user. The display unit 1806 may include a display panel 18061. The display panel 18061 may be configured in a form of a liquid crystal display (LCD), an organic light-emitting diode (OLED), or the like.

The user input unit 1807 may be configured to: receive entered digital or character information, and generate key signal input related to a user setting and function control of the electronic device. Specifically, the user input unit 1807 includes a touch panel 18071 and another input device 18072. The touch panel 18071 is also referred to as a touchscreen, and may collect a touch operation performed by a user on or near the touch panel 18071 (such as an operation performed by a user on the touch panel 18071 or near the touch panel 18071 by using any proper object or accessory, such as a finger or a stylus). The touch panel 18071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1810, and can receive and execute a command sent by the processor 1810. In addition, the touch panel 18071 may be of a resistive type, a capacitive type, an infrared type, a surface acoustic wave type, or the like. The user input unit 1807 may include another input device 18072 in addition to the touch panel 18071. Specifically, the another input device 18072 may include but is not limited to a physical keyboard, a functional button (such as a volume control button or a power on/off button), a trackball, a mouse, and a joystick. Details are not described herein.

Further, the touch panel 18071 may cover the display panel 18061. When detecting the touch operation on or near the touch panel 18071, the touch panel 18071 transmits the touch operation to the processor 1810 to determine a type of a touch event, and then the processor 1810 provides corresponding visual output on the display panel 18061 based on the type of the touch event. In FIG. 18, although the touch panel 18071 and the display panel 18061 are used as two independent parts to implement input and output functions of the electronic device, in some embodiments, the touch panel 18071 and the display panel 18061 may be integrated to implement the input and output functions of the electronic device. This is not specifically limited herein.

The interface unit 1808 is an interface for connecting an external apparatus with the electronic device 1800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1808 may be configured to receive input (for example, data information and power) from an external apparatus and transmit the received input to one or more elements in the electronic device 1800 or may be configured to transmit data between the electronic device 1800 and an external apparatus.

The memory 1809 may be configured to store a software program and various data. The memory 1809 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1809 may include a high-speed random access memory, and may further include a nonvolatile memory, for example, at least one magnetic disk storage device, a flash storage device, or another volatile solid-state storage device.

The processor 1810 is a control center of the electronic device, connects all parts of the entire electronic device by using various interfaces and lines, and performs various functions of the electronic device and data processing by running or executing a software program and/or a module that are/is stored in the memory 1809 and by invoking data stored in the memory 1809, to overall monitor the electronic device. Optionally, the processor 1810 may include one or more processing units. Preferably, an application processor and a modem processor may be integrated into the processor 1810. The application processor mainly processes an operating system, a user interface, an application program, and the like. The modem processor mainly processes wireless communications. It can be understood that, alternatively, the modem processor may not be integrated into the processor 1810.

The electronic device 1800 may further include the power supply 1811 (such as a battery) that supplies power to each component. Preferably, the power supply 1811 may be logically connected to the processor 1810 by using a power supply management system, so as to implement functions such as charging management, discharging management, and power consumption management by using the power supply management system.

In addition, the electronic device 1800 includes some function modules not shown, and details are not described herein.

Preferably, an embodiment of the present invention further provides an electronic device, including a processor 1810, a memory 1809, and a computer program that is stored in the memory 1809 and that can be run on the processor 1810. When the computer program is executed by the processor 1810, the processes of the foregoing key indication method embodiment are implemented and a same technical effect can be achieved. To avoid repetition, details are not described herein again.

An embodiment of the present invention further provides a computer-readable storage medium. The computer-readable storage medium stores a computer program, and when the computer program is executed by a processor, the processes of the foregoing key indication method embodiment are implemented and a same technical effect can be achieved. To avoid repetition, details are not described herein again. The computer-readable storage medium is, for example, a read-only memory (ROM), a random access memory (RAM), a magnetic disk, or an optical disc.

It can be understood that these embodiments described in some embodiments of the present disclosure may be implemented by hardware, software, firmware, middleware, microcode, or a combination thereof. For hardware implementation, a module, a unit, a submodule, a subunit, or the like may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, or other electronic units or a combination thereof used to perform the functions in this application.

For software implementation, the technology in some embodiments of the present disclosure may be implemented through modules (for example, procedures or functions) that perform the functions in some embodiments of the present disclosure. Software code may be stored in a memory and executed by a processor. The memory may be implemented in the processor or outside the processor.

Therefore, the objective of the present disclosure may also be implemented by running a program or a group of programs on any computing apparatus. The computing apparatus may be a well-known general apparatus. Therefore, the objective of the present disclosure may also be implemented by providing only a program product that includes program code for implementing the method or apparatus. In other words, such a program product also constitutes the present disclosure, and a storage medium that stores such a program product also constitutes the present disclosure. Apparently, the storage medium may be any well-known storage medium or any storage medium to be developed in the future. It should also be noted that in the apparatus and method of the present disclosure, it is obvious that each component or step may be decomposed and/or recombined. These decomposition and/or recombination shall be considered equivalent solutions of the present disclosure. In addition, the steps for performing the foregoing series of processing may be performed in a chronological order, but do not necessarily need to be performed in a chronological order. Some steps may be performed in parallel or independently.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present invention essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present invention.

The embodiments of the present invention are described above with reference to the accompanying drawings, but the present invention is not limited to the above specific implementations, and the above specific implementations are only illustrative and not restrictive. Under the enlightenment of the present invention, those of ordinary skill in the art can make many forms without departing from the purpose of the present invention and the protection scope of the claims, all of which fall within the protection of the present invention.

The invention claimed is:

1. A key indication method, applied to an electronic device, wherein the electronic device has at least one key, and the method comprises:
   obtaining state information of the electronic device; and
   in a case that the state information meets a preset condition, displaying a target indication icon corresponding to the key in a first manner, in a key display area corresponding to the key on a display screen;
   in a case that the state information does not meet the preset condition, displaying the target indication icon corresponding to the key in a second manner, in the key display area corresponding to the key on the display screen, or skipping displaying the target indication icon;

wherein the key has an active state of responding to a key operation function and an inactive state of not responding to the key operation function; wherein in a case that the state information meets the preset condition, the key is in the active state; or in a case that the state information does not meet the preset condition, the key is in the inactive state;

wherein in a case that the key is in the active state, the displaying a target indication icon corresponding to the key in a first manner, in a key display area corresponding to the key on a display screen specifically comprises: obtaining a target working state of the key; determining, based on a correspondence between a working state of the key and an indication icon of the key, the target indication icon corresponding to the target working state; and displaying the target indication icon corresponding to the key in the first manner, in the key display area corresponding to the key on the display screen;

wherein the key is a sensing key, and the obtaining a target working state of the key specifically comprises: obtaining a sensing parameter of the sensing key; if a variation of the sensing parameter reaches a preset threshold, determining that the target working state of the key is a trigger state; and if the variation of the sensing parameter is less than the preset threshold, determining that the target working state of the key is a non-trigger state; and the displaying the target indication icon corresponding to the key in the first manner, in the key display area corresponding to the key on the display screen specifically comprises: in a case that the target working state of the key is the trigger state, displaying the target indication icon corresponding to the key in the first manner, in the key display area corresponding to the key on the display screen, wherein the target indication icon is an icon having a first pattern; and in a case that the target working state of the key is the non-trigger state, displaying the target indication icon corresponding to the key in the first manner, in the key display area corresponding to the key on the display screen, wherein the target indication icon is an icon having a second pattern.

2. The method according to claim 1, wherein the key display area is different from a key operation area of the key.

3. The method according to claim 1, wherein the state information is a motion parameter of the electronic device, and the motion parameter comprises at least one of the following: a moving speed, a moving acceleration, or a flip angle.

4. The method according to claim 3, wherein the preset condition comprises at least one of the following: a moving speed of the electronic device is greater than a preset speed, a moving acceleration of the electronic device is greater than a preset acceleration, or a flip angle of the electronic device is greater than a preset angle.

5. The method according to claim 1, wherein in a case that the key is in the active state, the displaying a target indication icon corresponding to the key in a first manner, in a key display area corresponding to the key on a display screen comprises:

obtaining target application information;
configuring a key function corresponding to the key based on the target application information; and
displaying the target indication icon corresponding to the key function in the first manner, in the key display area corresponding to the key on the display screen.

6. The method according to claim 1, wherein the display screen is a foldable screen; and in a case that the key is in the active state, the displaying a target indication icon corresponding to the key in a first manner, in a key display area corresponding to the key on a display screen comprises:

obtaining a state of the foldable screen;
when the foldable screen is in a folding state, configuring a function of the key as a first key function, and displaying, in the key display area corresponding to the key on the display screen, a first target indication icon corresponding to the first key function; and
when the foldable screen is in an unfolding state, configuring the function of the key as a second key function, and displaying, in the key display area corresponding to the key on the display screen, a second target indication icon corresponding to the second key function.

7. A non-transitory computer-readable storage medium, wherein the non-transitory computer-readable storage medium stores a program, and when the program is executed by a processor, the steps of the key indication method according to claim 1 are implemented.

8. The non-transitory computer-readable storage medium according to claim 7, wherein the key display area is different from a key operation area of the key.

9. The non-transitory computer-readable storage medium according to claim 7, wherein the state information is a motion parameter of the electronic device, and the motion parameter comprises at least one of the following: a moving speed, a moving acceleration, or a flip angle.

10. An electronic device, comprising a processor, a memory, and a program that is stored in the memory and that can be run on the processor, wherein the electronic device has at least one key, wherein when the program is executed by the processor, the following steps are implemented:

obtaining state information of the electronic device; and
in a case that the state information meets a preset condition, displaying a target indication icon corresponding to the key in a first manner, in a key display area corresponding to the key on a display screen;
in a case that the state information does not meet the preset condition, displaying the target indication icon corresponding to the key in a second manner, in the key display area corresponding to the key on the display screen, or skipping displaying the target indication icon;

wherein the key has an active state of responding to a key operation function and an inactive state of not responding to the key operation function; wherein in a case that the state information meets the preset condition, the key is in the active state; or in a case that the state information does not meet the preset condition, the key is in the inactive state;

wherein in a case that the key is in the active state, the displaying a target indication icon corresponding to the key in a first manner, in a key display area corresponding to the key on a display screen specifically comprises: obtaining a target working state of the key; determining, based on a correspondence between a working state of the key and an indication icon of the key, the target indication icon corresponding to the target working state; and displaying the target indication icon corresponding to the key in the first manner, in the key display area corresponding to the key on the display screen;

wherein the key is a sensing key, and the obtaining a target working state of the key specifically comprises: obtaining a sensing parameter of the sensing key; if a variation of the sensing parameter reaches a preset threshold, determining that the target working state of the key is a trigger state; and if the variation of the sensing parameter is less than the preset threshold, determining that the target working state of the key is a non-trigger state; and the displaying the target indication icon corresponding to the key in the first manner, in the key display area corresponding to the key on the display screen specifically comprises: in a case that the target working state of the key is the trigger state, displaying the target indication icon corresponding to the key in the first manner, in the key display area corresponding to the key on the display screen, wherein the target indication icon is an icon having a first pattern; and in a case that the target working state of the key is the non-trigger state, displaying the target indication icon corresponding to the key in the first manner, in the key display area corresponding to the key on the display screen, wherein the target indication icon is an icon having a second pattern.

11. The electronic device according to claim 10, further comprising an interface unit, wherein the interface unit is an interface for connecting the electronic device to an external apparatus.

12. The electronic device according to claim 10, wherein the key display area is different from a key operation area of the key.

13. The electronic device according to claim 10, wherein the state information is a motion parameter of the electronic device, and the motion parameter comprises at least one of the following: a moving speed, a moving acceleration, or a flip angle.

14. The electronic device according to claim 13, wherein the preset condition comprises at least one of the following: a moving speed of the electronic device is greater than a preset speed, a moving acceleration of the electronic device is greater than a preset acceleration, or a flip angle of the electronic device is greater than a preset angle.

15. The electronic device according to claim 10, wherein in a case that the key is in the active state, the displaying a target indication icon corresponding to the key in a first manner, in a key display area corresponding to the key on a display screen comprises:
  obtaining target application information;
  configuring a key function corresponding to the key based on the target application information; and
  displaying the target indication icon corresponding to the key function in the first manner, in the key display area corresponding to the key on the display screen.

16. The electronic device according to claim 10, wherein the display screen is a foldable screen; and in a case that the key is in the active state, the displaying a target indication icon corresponding to the key in a first manner, in a key display area corresponding to the key on a display screen comprises:
  obtaining a state of the foldable screen;
  when the foldable screen is in a folding state, configuring a function of the key as a first key function, and displaying, in the key display area corresponding to the key on the display screen, a first target indication icon corresponding to the first key function; and
  when the foldable screen is in an unfolding state, configuring the function of the key as a second key function, and displaying, in the key display area corresponding to the key on the display screen, a second target indication icon corresponding to the second key function.

17. A key indication method, applied to an electronic device, wherein the electronic device has at least one key, and the method comprises:
  obtaining state information of the electronic device; and
  in a case that the state information meets a preset condition, displaying a target indication icon corresponding to the key in a first manner, in a key display area corresponding to the key on a display screen;
  in a case that the state information does not meet the preset condition, displaying the target indication icon corresponding to the key in a second manner, in the key display area corresponding to the key on the display screen, or skipping displaying the target indication icon;
  wherein the key has an active state of responding to a key operation function and an inactive state of not responding to the key operation function; wherein in a case that the state information meets the preset condition, the key is in the active state; or in a case that the state information does not meet the preset condition, the key is in the inactive state;
  wherein the display screen is a foldable screen; and in a case that the key is in the active state, the displaying a target indication icon corresponding to the key in a first manner, in a key display area corresponding to the key on a display screen comprises: obtaining a state of the foldable screen; when the foldable screen is in a folding state, configuring a function of the key as a first key function, and displaying, in the key display area corresponding to the key on the display screen, a first target indication icon corresponding to the first key function; and when the foldable screen is in an unfolding state, configuring the function of the key as a second key function, and displaying, in the key display area corresponding to the key on the display screen, a second target indication icon corresponding to the second key function.

18. The method according to claim 17, wherein the key display area is different from a key operation area of the key.

19. The method according to claim 17, wherein the state information is a motion parameter of the electronic device, and the motion parameter comprises at least one of the following: a moving speed, a moving acceleration, or a flip angle.

20. The method according to claim 19, wherein the preset condition comprises at least one of the following: a moving speed of the electronic device is greater than a preset speed, a moving acceleration of the electronic device is greater than a preset acceleration, or a flip angle of the electronic device is greater than a preset angle.

* * * * *